United States Patent Office 2,921,966
Patented Jan. 19, 1960

2,921,966
METHYLENECYCLOPROPANEMETHANOL

John A. Carbon, William B. Martin, and Leo E. Swett, Waukegan, Ill., assignors to Abbott Laboratories, Inc., North Chicago, Ill., a corporation of Illinois No Drawing. Application July 7, 1958
Serial No. 746,636

2 Claims. (Cl. 260—617)

This invention relates to a novel compound and to a process for its preparation. The compound prepared by the process hereafter disclosed is methylenecyclopropanemethanol which is structurally presented as:

This compound is useful as a chemical intermediate in the preparation of a compound which is orally effective as a hypoglycemic agent; that is, a compound which reduces blood sugar.

The novel intermediate disclosed herein is prepared by refluxing lithium aluminum hydride with a loweralkyl methylenecyclopropanecarboxylate which, in turn, is prepared by refluxing a loweralkyl 2-halo-2-methylcyclopropanecarboxylate with a metal hydride as disclosed more fully in co-pending application, Serial No. 746,638, filed of even date herewith. The loweralkyl 2-halo-2-methylcyclopropanecarboxylate is prepared by reacting an unsaturated haloalkyl with a loweralkyl diazo ester as disclosed more fully in co-pending application, Serial No. 746,635, filed of even date herewith. The novel compound of this invention is subsequently treated with a p-substituted benzenesulfonyl halide to form a methylenecyclopropanemethyl p-substituted benzenesulfonate in the manner presented in co-pending application, Serial No. 746,600, filed of even date herewith. The latter compound is reacted with a diloweralkyl formamidomalonate to form a diloweralkyl formamido-(methylenecyclopropylmethyl)malonate as more fully disclosed in co-pending application, Serial No. 746,637, filed of even date herewith.

The active hypoglycemic agent is prepared by hydrolysis and decarboxylation. This compound is α-amino-methylenecyclopropanepropionic acid, also known as hypoglycin A.

Hypoglycin A is one of the components extracted from the fruit Blighia sapida. This fruit is commonly known as Ackee. A second hypoglycemic component present in said fruit is known as hypoglycin B. Hypoglycin A has been widely investigated regarding its pharmacological and chemical properties. Physical and chemical constants of hypoglycin A and its hypoglycemic activity have been described by C. H. Hassall and K. Reyle in "Biochem. Journ.," volume 60, page 234 (1955) and "Nature," volume 173, page 356 (1954). The chemical structure of hypoglycin A was definitely established by C. V. Holt and W. Leppla in "Angewandt Chemie," volume 70, page 25 (1958).

The following example is presented as an embodiment of the process which produces the novel compound. It is not intended that said example be construed as an exclusive illustration.

EXAMPLE I

Methylenecyclopropanemethanol

In a three-necked round bottomed flask fitted with a mechanical stirrer, reflux condenser, drying tube, and dropping funnel is placed 200 ml. of dry ether and 4.56 gms. (0.12 mole) of lithium aluminum hydride. The stirrer is started, and a solution of 18.7 gms. (0.15 mole) of ethyl methylenecyclopropanecarboxylate in 100 ml. of dry ether is slowly added at a rate just sufficient to keep the ether refluxing gently. After refluxing for an hour after the addition is complete, the mixture is cooled in an ice-bath, and decomposed by the careful addition of 4.6 ml. of water, 4.6 ml. of 15% NaOH, and finally 13.8 ml. of water. The mixture is filtered, the colorless filtrate dried over anhydrous potassium carbonate, and distilled through a fractionating column. The product is obtained as a colorless oil (9.4 gms.; 75%); B.P. 138–139° C.; $n_D^{25}=1.4644$.

Analysis.—Calcd. for $C_5H_8O$.—Calculated: C, 71.41%; H, 9.59%; O, 19.00%. Found: C, 71.40%; H, 9.86%; O, 18.95%.

Others may practice the invention in any of the numerous ways which will be suggested by this disclosure to one skilled in the art. All such practice of the invention is considered to be a part hereof provided it falls within the scope of the appended claims.

We claim:
1. Methylenecyclopropanemethanol.
2. A method for preparing methylenecyclopropanemethanol comprising the addition of ethyl methylenecyclopropanecarboxylate in an inert organic solvent to about an equimolar amount of a lithium aluminum hydride in an inert organic solvent, refluxing said mixture and separating the product, methylenecyclopropanemethanol.

References Cited in the file of this patent

Golovchanskaya: Chem. Abstracts, vol. 35 (1941), p. 6931.
Owen et al.: Jour. Chem. Soc. (July 1955), p. 2385.
Hart et al.: Chem. and Industry (September 29, 1956), pp. 1014–15.